United States Patent Office 3,630,954
Patented Dec. 28, 1971

3,630,954
ORGANIC AMINE-STRONG BASE STABILIZED HIGH SURFACE AREA SILICA SOLS AND METHOD FOR PREPARING SAME
Paul C. Yates, Wilmington, Del., assignor to E. I. du Pont de Nemours and Company, Wilmington, Del.
No Drawing. Filed May 8, 1969, Ser. No. 823,185
Int. Cl. B01j *13/00;* B28b *7/34;* C01b *33/14*
U.S. Cl. 252—313 S    5 Claims

ABSTRACT OF THE DISCLOSURE

Compositions consisting essentially of colloidal silica sols having a surface area of from 950 to 1800 m.$^2$/gram stabilized with a co-stabilizer system consisting of (1) an organic or inorganic base having a basic dissociation constant greater than 10$^{-2}$ and (2) an organic monoamine are useful as refractory binders.

DESCRIPTION OF THE INVENTION

Background

Silica sols which have been stabilized with either alkali metal oxides or organic amines are known in the art. Thus, U.S. Pat. 3,326,910 to Weldes discloses the preparation of dilute silica sols substantially free of alkali oxide (that is containing less than 1%, by weight, of sodium calculated as Na$_2$O), by starting with a mixture of an organic amine and an alkali metal silicate and deionizing with the hydrogen form of an ion exchange resin or with a mixed hydrogen-amine form of the resin, until the alkali metal concentration is less than 1%, by weight. The patent also discloses subsequent concentration of such sols by autoclaving until the viscosity has dropped to a very low value, after which the sols can be concentrated to higher silica concentrations. The silica sols of Weldes generally have surface areas not in excess of 900 m.$^2$/gram and cannot be prepared by his process at silica concentrations of higher than 6% by weight.

The prior art is also aware of compositions in which amines are used to enhance the stability of alkali silicate solutions having a mole ratio of SiO$_2$ to M$_2$O (where M is an alkali metal) in the range of from 3.9:1 to 6:1. Thus, the objective of Canadian Pat. 537,873 to Damusis is to prepare a binder composition which still contains appreciable amounts of sodium oxide as shown by the relatively low SiO$_2$ to metal oxide mole ratio of from 3.9 to 6.0. Although the compositions of Damusis are useful for the purposes for which they are intended, namely to make an inorganic paint, they are deficient as high temperature binders because the alkali metal oxide content is so high that the refractory properties are insufficient to enable them to be used at elevated temperatures. The high concentration of alkali metal oxide in the compositions of Damusis also lead to devitrification and subsequent disruption of refractory bonds made with these compositions when the crystalline forms of silica formed by the devitrification reaction are cooled through the phase transformation point from a high to low crystal modification which is characteristic of all of the known crystal forms of silica. By using a carefully controlled and substantially smaller amount of a strong base than Damusis, it has been found that silica sols useful in high temperature bonding applications can be produced.

SUMMARY

This invention is directed to a composition consisting essentially of a silica sol having (i) a surface area of from 950 m.$^2$/gram to 1,800 m.$^2$/gram (ii) a pH in the range of from 10.5 to 12.0 and (iii) from 10% to 30%, by weight, of SiO$_2$; the sol being stabilized with a co-stabilizer system consisting of:

(1) A material having a basic dissociation constant greater than 10$^{-2}$ selected from the group consisting of (a) a monovalent organic base, (b) a monovalent inorganic base, and (c) mixtures thereof, said material being present in an amount ranging from 0.226 moles to 0.645 moles per kilogram of the composition and the mole ratio of SiO$_2$ to basic oxide being in the range of from 7:1 to about 20:1, and (2) At least one amine selected from the group consisting of (I) compounds having the formula:

wherein R$_1$, R$_2$, and R$_3$ are independently selected from the group consisting of hydrogen, alkyl having 1 to 6 carbon atoms, and alkanol having 1 to 6 carbon atoms, with the proviso that R$_1$, R$_2$, and R$_3$ cannot all be hydrogen; (II) morpholine, and (III) cyclohexylamine, the amine being present in an amount ranging from 0.05 moles to 2.0 moles per kilogram of the composition.

Process for preparing compositions

The compositions of this invention can be made by treating an aqueous solution of a silicate selected from the group consisting of:

(I) An alkaline ionic silicate of a monovalent organic base having a basic dissociation constant greater than 10$^{-2}$, (II) An alkaline ionic silicate of a monovalent inorganic base having a basic dissociation constant greater than 10$^{-2}$, and (III) Mixtures thereof, said solution containing from 10% to 30%, by weight, SiO$_2$, with an ion-exchange resin in the presence of an amine until:

(A) the pH is in the range of from 10.5 to 12.0,
(B) the concentration of the cation of monovalent base having a dissociation constant greater than 10$^{-2}$ is lowered to at least 0.645 moles, but no lower than 0.226 moles, per kilogram of composition, and
(C) the mole ratio of SiO$_2$ to basic oxide is in the range of from 7:1 to about 20:1;

said amine being selected from the group consisting of
(I) compounds having the formula:

wherein R$_1$, R$_2$, and R$_3$ are independently selected from the group consisting of hydrogen, alkyl having 1 to 6 carbon atoms, and alkanol having 1 to 6 carbon atoms, with the proviso that R$_1$, R$_2$, and R$_3$ cannot all be hydrogen;
(II) morpholine, and (III) cyclohexylamine and being present during the treating in a sufficient amount that the final concentration of the amine is in the range of from 0.05 moles to 2.0 moles per kilogram of composition.

(A) Silicates.—The silicates used in the process of this invention are alkaline ionic silicates of strong monovalent organic or inorganic bases having a basic dissociation constant greater than 10$^{-2}$. Exemplary of such silicates are sodium silicate, potassium silicate, lithium silicate, guanidine silicate, tetramethylammonium silicate, and tetraethanolammonium silicate. The preferred silicate is sodium silicate. Silicates of strong bases are readily available from commercial sources and include solutions of sodium silicate having molar ratios of SiO$_2$ to Na$_2$O from 1:1, in the case of sodium metasilicate to as high as below about 3.9:1. Their usual concentration ranges from 20% $SiO_2$ to as high as 30% $SiO_2$. All such commercially available silicates are suitable as starting materials for the processes of our invention.

(B) Organic amine.—The organic amines used in preparing the compositions of the invention are those selected from the group consisting of (I) compounds having the formula:

wherein $R_1$, $R_2$, and $R_3$ are independently selected from the group consisting of hydrogen, alkyl having 1 to 6 carbon atoms, and alkanol having 1 to 6 carbon atoms, with the proviso that $R_1$, $R_2$, and $R_3$ cannot all be hydrogen; (II) morpholine, and (III) cyclohexylamine. Exemplary of the amines which are suitable are ethylamine, diethylamine, triethylamine, methylamine, dimethylamine, trimethylamine, ethanolamine, diethanolamine, and triethanolamine, morpholine, di-n-propylamine, butylamine, isopropylamine, cyclohexylamine, and pentylamine.

The preferred amines are those having the highest basic dissociation constants, and for this reason diethylamine and di- and trimethylamine are highly preferred. For applications where the odor of the amines is objectionable, amines with lower vapor pressures such as the ethanolamines are suitable.

The amine can be supplied to the compositions of this invention by two methods. First, when the ion exchange resin is in the hydrogen form the amine can be added in the proper proportions to the silicate during treatment with the ion exchange resin. Second, the silicate can be treated with the amine form of an ion exchange resin. In this latter method, as the ion exchange resin picks up cation from the ionic silicate, amine is released.

Regardless of the method used to supply amine to the composition, the final amine concentration in the composition must be in the range of from 0.05 moles to 2.0 moles per kilogram of composition.

(C) Monovalent base.—The base present in the compositions of this invention can be any water-soluble strong monovalent organic or inorganic base having a basic dissociation constant greater than $10^{-2}$. Suitable bases include the alkali metal hydroxides, such as lithium hydroxide, potassium hydroxide, or sodium hydroxide. Strong organic bases may also be used, such as tetraethanolammonium hydroxide, tetramethylammonium hydroxide, tetraethylammonium hydroxide, and guanidine hydroxide.

The strong base component is supplied to the compositions by the starting silicate material in which it is present. The final proportion of the base is controlled by the ion exchange resin. As the ion exchange resin picks up cations from the ionic silicate while it releases $H_3O+$ or amine, the pH of the composition decreases to the desired range and the concentration of the cation decreases correspondingly to 0.645 moles per kilogram of composition but no lower than 0.226 moles per kilogram of composition.

(D) Relative proportions of ingredients.—It is critical that the relative proportions and concentrations of the three essential ingredients in the composition be maintained within narrowly designated limits. The silica concentration must be within the range of 10% to 30%, by weight. Below 10%, when the compositions of this invention are employed as binders, the low silica concentration leads to excessive shrinkage during drying operations and the binding characteristics are inferior. While it is possible to prepare compositions of the invention containing up to 35% of $SiO_2$, it is preferred to have 30% $SiO_2$ or less, because of excessive viscosities.

It is also critical to maintain the concentration of the strong base within certain limits, as well as to maintain the ratio of concentration of silica to the concentration of strong base within certain prescribed limits. For example, it is necessary to maintain the strong base concentration within the molar range of from 0.226 moles to 0.645 moles per kilogram of composition and a silica to basic oxide molar ratio within the range of from 7:1 to 20:1. In the case of sodium oxide, for example, the limits on the minimum and maximum concentration of base corresponds to a weight concentration of sodium oxide in solution of from 1.4% to 4.0%. If the strong base molarity and/or the mole ratio of silica to strong base oxide gets outside these limits the products do not perform satisfactorily. For example, if the mole ratio of $SiO_2$ to basic oxide exceeds about 20, it is found that the compositions can no longer be prepared in concentrated form directly. It is also found that the surface areas are not sufficiently high to give satisfactory binding properties and the products of the invention cannot be rapidly chemically set by the addition of carbon dioxide, for example.

Conversely, if the ratio of $SiO_2$ to basic oxide is less than 7 to 1, or if the concentration of alkali metal cation in the solution exceeds a total molarity of 0.645, it is found that the refractory properties are unsatisfactory. Thus, when compositions containing too low a mole ratio of silica to sodium oxide are employed as refractory binders, their melting point is low and they will devitrify on prolonged exposure even at moderate temperature.

Both the absolute amount of amine and the mole ratio of silica to amine are also critical variables in obtaining satisfactory properties for the products of this invention. The concentration of organic amine can broadly range from 0.05 moles to 2.0 moles of amine per kilogram of composition, and preferably from about 0.10 moles to 1.5 moles. When concentrations of amine fall below the absolute lower limit, the surface area of the products is two low for optimum binding ability and the elevated temperature storage characteristics are poor. Concentrations of amines above 2.0 moles per kilogram of solution contribute relatively little additional stability or surface area, and the use of excessively high concentrations of amine will even lead to flocculation of the products of the invention, particularly at concentrations of silica which are near the upper preferred limit of 30% $SiO_2$. As little as 0.05 moles of amine will increase the surface area of the products of the invention prepared at room temperature by almost 50% over what they would have been in a sol containing the same amount of $SiO_2$ and sodium oxide, but which contain no amine. This is particularly surprising, in view of the fact that the same amount of additional strong organic or inorganic base will not lead to any comparable increase in surface area.

While the reasons for this substantial enhancement of the surface area in mixtures of amines and strong bases is not completely understood, it is believed that the amines function by a different and complementary mechanism of stabilization than do strong bases. It has long been known that strong bases stabilize high surface area silica sols by absorption of hydroxyl ions onto the surface of the particles. This is shown, for example, by the considerable decrease in the pH of a solution containing a free, strong organic or inorganic base on addition of a high surface area silica sol to the solution.

There are several indications, however, that organic amines function in a synergistic manner with strong bases when both are present in solution. One is the very substantial enhancement of the surface area of such solutions over the surface area which would be observed were either of the stabilizing species present alone in solution at the same total concentration as the sum of the concentration of both stabilizing agents.

A second indication is the much greater stability of such systems toward flocculation or gelation at high silica concentrations. For example, if one deionizes a silicate solution containing 15% $SiO_2$ with the hydrogen or ammonium form of an ion exchange resin until the $SiO_2$ to sodium oxide ratio is in the neighborhood of 7:1 to 20:1, such systems have only very limited stability, and will gel in time periods from a few minutes to a relatively few hours, depending on where in this ratio range the deionization is carried out. Similarly, as taught by Weldes, if a solution even only somewhat more than 6% $SiO_2$ is deionized to free it substantially completely of sodium oxide or other strong bases, even in the presence of an amine, this will also not be stable and will gel on the resin during the process of deionization. When, however, both constituents are present in appreciable quantities within the limits taught in previous sections of this invention, even highly concentrated silicate solutions such as those containing 30% $SiO_2$ not only do not gel on the resin bed, but are indefinitely stable at room temperature and can be stored for months at elevated temperatures such as 60° C.

A further indication of the synergistic effect which gives a clue as to mechanism which is occurring, is that if systems containing both stabilizing agents, that is, both the organic amines and a strong base, are extracted with chloroform or other suitable water-immiscible solvents, it is found that there is an amount of the organic amine which is proportional to the surface area of the silica in solution which cannot be extracted into the chloroform phase under conditions which would lead to its extraction in the absence of a silica sol. Since this amount is proportional to the concentration of silica in the solution, and to its specific surface area, or, more simply, to the total surface area of silica in solution, and since it is also determined by the amount of strong base which is in solution, it seems reasonable to suppose that the strong base creates negatively charged sites on the amorphous silica surface by the adsorption of hydroxyl ions and that these negatively charged sites, in turn, cause the stable chemisorption of the organic amine. Organic amines when present alone in solution in the absence of a strong base, can furnish only a limited number of hydroxyl ions for adsorption onto the silica surface because of their relatively low basic dissociation constants. The strong bases, however, are almost completely dissociated in solution, and therefore they contribute in the synergistic mechanism the required high concentration of charged hydroxyl ion sites on the amorphous silica surface.

The presence of the organic amine, however, is also necessary for this synergistic action to take place, since the cations of strong bases are not themselves well suited to strong adsorption on the silica surface.

Thus each member of the pair of costabilizing agents performs a job which is not possible for the other. The organic amine can be strongly adsorbed but is not capable of furnishing a high concentration of hydroxyl ions to create the necessary number of negatively charged sites for adsorption, whereas the strong inorganic or organic bases can create the necessary negatively charged sites, but cannot then themselves be subsequently adsorbed to complete the stabilization. It is this extra energy of adsorption of the amines which occurs only in the presence of a sufficient number of negatively charged sites, that can be furnished only by the strong base, and not by the amines alone, which increases the total free energy of adsorption of the stabilizing cofunctioning system to a sufficient value to maintain the very high surface areas characteristic of the products of this invention.

Such high surface areas of concentrated sols can not be achieved except at excessively high alkali concentrations in those products of the prior art which are stabilized either primarily by strong bases or primarily by organic amines.

(E) Ion exchange resins.—Ion-exchange resins suitable for preparing the compositions of this invention are commercially available and any of a variety of such resins are satisfactory. A number of these resins are described in "Ion Exchange Resins," by Robert Kunin, 2nd ed., John Wiley & Sons, Inc. N.Y. For example pages 89 through 96 tabulate many of the different types of cation exchange resins available commercially. Generally speaking, all such cation exchange resins will be satisfactory for the purposes of this invention.

The more common commercially available organic cation exchange resins can be classified into two types. The first are called "strong" cation exchange resins, because the hydrogen form of such resins have a large acid dissociation constant, i.e., they are strongly acidic. Such resins are usually characterized by sulfonic acid or phosphonic acid functional groups as the group responsible for the ion-exchange capability. Commonly, such resins are prepared by copolymerizing styrene with various amounts of divinyl benzene, using a vinyl type polymerization catalyst to obtain a resinous product of a size convenient for ion-exchange operations. This resin or polymer is then sulfonated with sulfuric acid to prepare the sulfonic acid derivatives of the styrene and divinyl benzene moieties, and thus introduce the ion-exchange functional group into the resin. Excess acid is removed, the resin washed, and conditioned by soaking in water. This process gives the hydrogen form of a strong acid ion-exchange resin.

The hydrogen resin can be converted to the amine form of a similar structure by contacting it with a concentrated aqueous solution of the organic amine, or with an aqueous solution of the organic aminium salt. Thus, one could contact such a strong acid ion-exchange resin with aqueous dimethylamine, or with an aqueous solution of dimethylamminium hydrochloride. In either event, the amminium ion is adsorbed onto the resin, thus preparing the amminium form of the resin.

After such a resin has been used in preparing the compositions of the invention, it will contain a greater or lesser amount of sodium ions or other strong base cations, and it may be regenerated and reused by contacting it with a solution of a strong acid to regenerate the hydrogen form, a solution of amminium ions to give the amminium form, or with mixtures of the two in various proportions to give mixed hydrogen-amminium regenerated resins.

While the most commonly available organic ion-exchange resins of the strong acid type contain sulfonic acids as their exchanging functional groups, so-called "weak" acid cation exchange resins usually have carboxylic acid functional groups. There are many ways of preparing such weak acid ion-exchange resins, including oxidizing coal or carbon black with nitric acid, reacting a mixture of phenol, acrolein, and the semiamide of oxamic acid, and other procedures. However, the most common method used commercially is to copolymerize either methacrylic or acrylic acid with divinyl benzene. The copolymerization can be catalyzed by a typical vinyl catalyst such as benzoyl peroxide and the required resin thus prepared directly. The polymerization may be conducted either in an emulsion or in an organic solvent system to give the hydrogen form of the resin. The process for preparing the amminium form of these resins is substantially identical with that for preparing the amminium form of the sulfonic acid resins.

A wide variety of less common cation exchange resins may be prepared, such as by the reaction of phosphoric acid instead of sulfuric acid to introduce an alkyl phosphate exchangeable group instead of sulfonic or carboxylic acid groups. Certain inorganic ion-exchange resins such as either naturally-occurring or synthetic zeolytes may also be used for preparing the compositions of the invention. So long as the resin is capable of removing sodium ions or the cations of other strong bases from silicate solutions and does not adversely react with the silicate anions, to form insoluble compounds, they may be employed if desired. However, normally the more commonly occurring strong acid and weak acid ion exchangers of the type described above will be used.

(F) Process conditions.—The process of this invention involves the deionization of an ionic silicate aqueous solution containing from 10% to 30% $SiO_2$, with an ion exchange resin to lower the concentration in solution of alkaline cations associated with the silicate solution to within the limits previously set forth, in the presence of sufficient organic amine to maintain its concentration within the ranges previously set forth.

The compositions can be made by adding the amine to the ionic silicate and treating the mixture with either the hydrogen form of an ion exchange resin or a mixture of the hydrogen and amine form of ion exchange resins. Alternatively, the silicate can be treated with the amine form of an ion exchange resin.

The silicate is treated with the ion exchange resin until the pH is from 10.5 to 12, preferably 10.8 to 11.8. Thereafter, the ion exchange resin is removed from the solution containing the silica, amine and remaining strong base by filtration, sedimentation, or centrifugation, and the product recovered. It is necessary to maintain the concentrations of all constituents and the pH within the limits previously noted during the deionization operation since even momentary operation outside these limits will cause gelation when operating at the high silica concentrations characteristic of the processes of the invention. Thus, if too much hydrogen resin is employed, while too little amine is present in solution, deionization will progress too far and gelation will occur. Since the processes of this invention are operated always at between 10% and 30% $SiO_2$, conditions causing gelation will always exist unless the limits of this invention are observed.

While pH is a necessary guide for controlling the deionization process, it is not the only such guide. The organic amines which can be employed in the processes of the invention vary substantially in their basic dissociation constants. Thus, the same pH would not be obtained at a comparable concentration of silica, strong base and organic amine for an amine such as ethanolamine, as would be obtained if the amine were diethylamine. The pH is also affected by the concentration and surface area of silica present, the mole ratio of silica to amine, the mole ratio of silica to strong base, and the concentration of neutral salts in solution.

There is a relatively simple way to control all of these variables satisfactorily during the operation of the process. The distribution coefficient of an organic amine in its amminium form between an ion exchange resin and an aqueous solution in contact with this resin is a characteristic property of the particular amine employed, the type of ion exchange resin, and the pH of the system. Normally, it is not greatly influenced by the particular strong base with which the amine is exchanging. Employing techniques well known to the art, it is a simple matter to determine the distribution coefficient at a particular pH, for a particular organic amine, and any desired strong base. This can be done by equilibrating a mixture of strong base, amine, resin, and water at the desired pH, recovering the resin, and analyzing for the ratio of amine to strong base cation on the resin. Once this distribution coefficient has been determined, it can be employed to predict within the necessary tolerances for this invention the percentage of a given strong base which will be picked up per unit amount of resin when operating under the desired pH conditions. The above procedure will enable one skilled in the art to quickly determine the amount of resin which is to be mixed with the silicate solution to remove the required amount of strong base cation and achieve the desired end composition.

Even without a precise determination of the distribution coefficient, it is often satisfactory to assume that the ratio of amminium ions to strong base cations on the resin will be the same as it is in the solution overall. If a reasonable period of time is allowed for the resin to equilibrate with the surrounding aqueous phase, for example, 15 minutes or more, it will be found that even this rough guide is sufficiently accurate for adequate control of the processes of this invention in most instances.

Exceptions may occur with bulky amines such as ethanolamine which may have some difficulty in entering and occupying all of the available sites on the ion exchange resin because of their large size. In such cases, a direct determination of the distribution coefficient as described above is more satisfactory than the approximation of a proportional distribution of all cations between the resin phase and the aqueous phase.

The overall $SiO_2$ to total base ratio is largely determined by the concentration of hydrogen ions on the resin. Thus it is possible to employ mixtures of the hydrogen form of an ion exchange resin and the amine form of an ion exchange resin, and by control of the relative amount of these, and also control of the total amount of resin relative to solution, one may vary the overall ratio within those limits described above as being satisfactory.

Generally, during the operation of the processes of this invention, the temperature will be room temperature, since this is convenient and ensures a high surface area in the finished product. Operation at higher temperatures can be performed if desired, but the temperature should not be allowed to exceed 70° C., since under these conditions the adsorption of the amines is interfered with by the thermal motion of the amine groups, the colloidal silica particles will grow in size, and the specific area of the silica will decrease below the limits for the products of this invention.

Following separation of the resin from the product, it may be regenerated either in the hydrogen form, the amine form, or a mixed form by contacting it with an appropriate solution containing a high concentration of hydrogen ions, amminium ions, or a mixture of the two. It can then be reemployed to prepare more of the product of the invention.

Characterization of the products of the invention

Since the products of this invention have very high surface areas, much higher than those of previously known concentrated stable silica sols, it is difficult to determine their surface areas in the conventional manner. For example, it is almost impossible to dry the products of this invention from aqueous solution without causing substantial particle growth, even operating with the most stringent precautions detailed in prior art techniques. It is, however, possible to determine the surface area of the products of this invention quite satisfactorily employing the base titration surface area method developed by G. W. Sears, published in Analytical Chemistry, 28, 1961 (1956).

Concentrations of silica can be determined by any of the many procedures conventionally employed in the art. Concentration of organic amines can be determined by an analysis for percent nitrogen, percent carbon or other atom percentages characteristic of the organic amines and not common to the other constituents of the solution. Concentrations of strong bases can be determined by atomic adsorption analysis in the case of the inorganic bases, or can be deduced from nitrogen to carbon ratios or from infrared analyses characteristic of the organic base, when organic bases are mixed with the organic amine. Total base concentrations can be determined by titrations with strong acids to a pH of 6, as is conventional in the art.

Examples

The following examples illustrate the compositions of this invention and methods for making same. Parts are by weight unless otherwise indicated.

Example 1

Nine hundred and eight grams of the hydrogen form of a sulfonic acid resin having an ion exchange capacity of 5 milliequivalents per gram of dry resin and consisting of a polystyrene matrix crosslinked with divinyl benzene, and sulfonated to give the sulfonic acid ion exchangeable groups, sold under the tradename of "Rexyn" 101 and distributed by the Fisher Scientific Co., are converted to a substantially saturated dimethylamminium form by contacting the hydrogen resin with a large excess of a 25% aqueous solution of dimethylamine. Six hundred grams of a 30% $SiO_2$ commercially available sodium silicate containing a mole ratio of $SiO_2$ to $Na_2O$ of 3.22:1 are mixed with 120 grams of water and this is stirred for 10 minutes with the above resin. The resin is filtered out and the resulting product of the invention is obtained. The pH of this solution is 11.0, and chemical analysis shows it to contain 1.95% sodium oxide, 21.94% $SiO_2$ and 1.28% nitrogen originating from the dimethylamine. The $SiO_2$ to $Na_2O$ ratio is 11.25, and the surface area as determined by base titration using the method of G. W. Sears, previously referred to, is 1760 m.$^2$/gram. The molality of dimethylamine calculated from the nitrogen analysis is 0.91 moles per 1000 grams of solution, and the number of moles of sodium hydroxide is 0.62 per 1000 grams of solution. The molality of total titratable base is therefore 1.53, and the mole ratio of silica to total titratable base oxide is 4.80.

This product is stored at 60° C. in a closed sealed flask and shows no appreciable change in turbidity or viscosity in more than two months storage under these conditions. The surface area has decreased slightly but is still well in excess of 1,000 m.$^2$/gram. This product is an excellent film-former and binder and is used to prepare ceramic shells for precision investment casting of molten metals, in which it is employed as the binder for refractory amorphous silica grain, as a binder for an aluminosilicate refractory fiber, and as a film-forming binder for zinc-rich paint.

Example 2

Three hundred grams of the sodium silicate of Example 1 having an initial pH of 11.7, are mixed with 162.3 grams of a 25% aqueous dimethylamine. While mixing the pH increases to 12.5. This is deionized with 400 grams of "Rexyn" 101 hydrogen sulfonic acid resin having the characteristics described in Example 1. After 5 minutes of stirring, the pH decreases to 11.0, and the sample is separated from the resin. The surface area of the silica in the sample is determined using the base titration technique of Sears, and the surface area is 1120 m.$^2$/gram. The sample contains 17.81% $SiO_2$, 2.43% sodium oxide, and 1.28% nitrogen originating from the dimethylamine. This gives an $SiO_2$ to sodium oxide mole ratio of 7.33, and a molality of amine of 0.91. The mole ratio of silica to titratable basic oxide including both the sodium oxide and the amine is 3.50. This composition is an excellent film-forming and binding agent in applications similar to those described in Example 1.

Example 3

One thousand three hundred and thirty three grams of the silicate used in Example 1 is diluted to 2000 grams with water, to give a solution having an initial pH of 11.3. Fourteen hundred grams of the hydrogen form of "Rexyn" 101 sulfonic acid resin is mixed with this solution and stirred for 5 minutes, to give a stable solution having a pH of 10.8. The deionization is performed after 41.2 grams of diethylamine in the form of the pure liquid amine has been added to the solution. It is then separated from the resin and characterized. The percent silica is found to be 15.53%, sodium oxide 2.29%, nitrogen 0.18%, and the surface area as determined by base titration technique is 1190 m.$^2$/grams. The above corresponds to a silica to sodium oxide molar ratio of 7 to 1, and 0.13 moles of diethylamine per 1000 grams of solution. An acid base titration indicates that the composition is 0.90 molal in total titratable base. The molar ratio of silica to total titratable oxide including both the strong base and the amine is 5.75.

Example 4

A sample of the sodium silicate used in Example 1 is diluted to an $SiO_2$ concentration of 15%. It is then deionized with the hydrogen form of an ion exchange resin to a pH of 10.6. After standing for approximately 15 minutes, this solution starts to gel. Two hundred grams of the sample are stirred with 9.1 grams of diethylamine. The pH increases from 10.7 to 11.4, and all evidences of gelation such as high viscosity and turbidity disappear. This material is analyzed and shown to contain 15% $SiO_2$ and 1.61% sodium oxide. This represents an $SiO_2$ to $Na_2O$ mole ratio of 9.30. Analysis also shows it to be 0.62 molar in amine and by base titration it is shown to have a surface area of 1093 m.$^2$/gram. The mole ratio of silica to total titratable base computed as the base oxide is 3.73.

Example 5

Two hundred grams of a 15% $SiO_2$ sodium silicate containing a mole ratio of $SiO_2$ to $Na_2O$ of 3.22:1 are mixed with 7.6 grams of ethanolamine and the pH rises from 11.2 to 11.45. This is then deionized with 80 grams of "Rexyn" 101 hydrogen resin and after stirring for 5 minutes, the pH drops to 10.6. It is then recovered from the resin and shown to contain 0.800 moles of total titratable base. Analysis shows it to contain 11.45% of silica, 1.39% sodium oxide, corresponding to a silica to sodium oxide ratio of 8.24. The amine content corresponds to 0.41 mole of amine per 1000 grams of solution and the surface area by base titration is 1116 m.$^2$/gram. The mole ratio of silica to total titratable base calculated as the base oxide is 6.23.

Example 6

A sample of lithium silicate having a mole ratio of silica to lithium oxide of 3.2:1 is prepared by reacting the required proportions of lithium hydroxide with an 800 m.$^2$/gram colloidal silica prepared by the precipitation of sodium silicate with sulfuric acid and washing to free it of soluble salts. The precipitated silica and lithium hydroxide are heated at 90° C. for an hour, after which the colloidal silica dissolves. The product is a water-clear solution of lithium silicate of the above mole ratio and contains 30% $SiO_2$. Nine hundred and eight grams of the hydrogen form of the sulfonic acid ion exchange resin used in Example 1 are converted to a substantially saturated dimethylaminium form by contacting the hydrogen resin with a large excess of a 25% aqueous solution of dimethylamine. Six hundred grams of the lithium silicate solution are diluted with 120 grams of water and is stirred for 10 minutes with the ion exchange resin. The resin is filtered out and the resulting product of the invention is obtained. The pH of the solution is 11.3. Chemical analysis shows it to contain 0.95% lithium oxide, 22.0% $SiO_2$, and 1.35% nitrogen originating from the dimethylamine. The silica to lithium oxide mole ratio is 11.5:1, and the surface area, as determined by the base titration method of Sears, is 1700 m.$^2$/gram. This product is indefinitely stable on storage at room temperature, and is an excellent binder for zinc-rich paints, showing good water resistance even on air drying at room temperature.

Example 7

One thousand grams of a 15% $SiO_2$ solution of potassium silicate having a $SiO_2$ to $K_2O$ ratio of 3.99:1, is prepared by dilution of a 30% $SiO_2$, commercially available, composition having the same silica to potassium oxide ratio. This is deionized with a sufficient amount of the "Rexyn" 101 hydrogen form sulfonic acid ion exchange resin described in Example 1 to adjust the $SiO_2$ to potassium oxide ratio to 20:1. This solution, which is of very limited stability (only a few minutes after deionization before gelling), is added to 87 grams of morpholine. The resulting solution is stable indefinitely on room temperature storage and is stable in a closed bottle to storage at 60° C. for periods of time in excess of a month. The surface area is determined by the base titration procedure of Sears and is found to be 1100 m.$^2$/gram.

Example 8

A solution of amorphous guanidine silicate containing 20% SiO$_2$ and having a mole ratio of SiO$_2$ to guanidine of 1:1 is prepared by dissolving a 30%, 400 m.$^2$/gram specific surface area silica sol in a solution of guanidine hydroxide prepared by reacting guanidine carbonate with calcium hydroxide in stoichiometric proportions and filtering to remove the precipitated calcium carbonate. This solution is deionized with 1,150 grams of a dimethylamine sulfonic acid cation exchange resin prepared as described in Example 1. After separating the resin by filtration, the silica to guanidine oxide mole ratio is found to be 7.5:1, and the solution contains 1.0 mole of dimethylamine per kilogram. The silica concentration is 20%. The pH of this solution is 11.4. The surface area, as determined by the base titration procedure of Sears is 1500 m.$^2$/gram. This product is a good high temperature refractory binder, because it contains virtually no alkali metal cations capable of causing fluxing, devitrifying or softening of refractory materials at high temperatures.

Uses of the compositions

The compositions of this invention are useful as film-forming and binding agents in a variety of applications. Their very high surface area and their high chemical reactivity enable them to be set rapidly by chemical techniques such as by exposure to carbon dioxide gas, the addition of acids, or other techniques for rapidly adjusting the pH. In this, the compositions of this invention are similar to the silicates of the prior art. However, they possess better water resistance and refractory properties than do the silicate compositions of the art which retain undesirably large quantities of alkali metal ions. Thus the compositions of this invention are useful for many refractory purposes where the sodium ion concentration or concentration of other inorganic cations such as potassium or lithium were too high to make the silicates of the prior art suitable.

The compositions of this invention are useful as binding agents in zinc-rich paints, as high temperature binders for precision investment casting molds, as high temperature binders for inorganic fibers such as glass wool, fiberglass, refractory aluminosilicate fibers, asbestos and the like, and, in general, for almost any application in which the high binding capacity and rapid chemical reactivity hitherto characteristic of alkali metal silicates must be combined with refractory characteristics hitherto only attainable using lower surface area, less reactive, and less efficient conventional colloidal silica sols of the prior art.

I claim:

1. A composition consisting essentially of an aqueous silica sol having (i) a surface area of from 950 m.$^2$/gram to 1,800 m.$^2$/gram (ii) a pH in the range of from 10.5 to 12.0 and (iii) from 10% to 30%, by weight, of SiO$_2$; the sol being stabilized with a co-stabilizer system consisting of:
   (1) a material having a basic dissociation constant greater than 10$^{-2}$ selected from the group consisting of (a) a monovalent organic base, (b) a monovalent inorganic base, and (c) mixtures thereof, said material being present in an amount ranging from 0.226 moles to 0.645 moles per kilogram of the composition and the mole ratio of SiO$_2$ to basic oxide being in the range of from 7:1 to about 20:1, and
   (2) at least one amine selected from the group consisting of (I) compounds having the formula:

wherein R$_1$, R$_2$, and R$_3$ are independently selected from the group consisting of hydrogen, alkyl having 1 to 6 carbon atoms, and alkanol having 1 to 6 carbon atoms, with the proviso that R$_1$, R$_2$, and R$_3$ cannot all be hydrogen; (II) morpholine, and (III) cyclohexylamine, the amine being present in an amount ranging from 0.05 moles to 2.0 moles per kilogram of the composition.

2. The composition of claim 1 wherein the amine is selected from the group consisting of diethylamine, dimethylamine, trimethylamine, and ethanolamine.

3. A method for preparing the composition of claim 1 comprising treating an aqueous solution of a silicate selected from the group consisting of:
   (I) an alkaline ionic silicate of a monovalent organic base having a basic dissociation constant greater than 10$^{-2}$,
   (II) an alkaline ionic silicate of a monovalent inorganic base having a basic dissociation constant greater than 10$^{-2}$, and
   (III) mixtures thereof,
said solution containing from 10% to 30%, by weight, SiO$_2$, with an ion-exchange resin in the presence of an amine until:
   (A) the pH is in the range of from 10.5 to 12.0,
   (B) the concentration of the cation of monovalent base having a dissociation constant greater than 10$^{-2}$ is lowered to at least 0.645 moles, but no lower than 0.226 moles, per kilogram of composition, and
   (C) the mole ratio of SiO$_2$ to basic oxide is in the range of from 7:1 to about 20:1;
said amine being selected from the group consisting of
   (I) compounds having the formula:

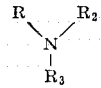

wherein R$_1$, R$_2$, and R$_3$ are independently selected from the group consisting of hydrogen, alkyl having 1 to 6 carbon atoms, and alkanol having 1 to 6 carbon atoms, with the proviso that R$_1$, R$_2$, and R$_3$ cannot all be hydrogen; (II) morpholine, and (III) cyclohexylamine
and being present during the treating in a sufficient amount that the final concentration of the amine is in the range of from 0.05 moles to 2.0 moles per kilogram of composition.

4. The process of claim 3 wherein said ion exchange resin is in the hydrogen form.

5. The process of claim 3 wherein said ion exchange resin is in the amine form.

References Cited

UNITED STATES PATENTS

| | | | |
|---|---|---|---|
| 2,601,291 | 6/1952 | Horning et al. | 252—313 |
| 2,601,352 | 6/1952 | Wolter | 252—313 |
| 2,614,994 | 10/1952 | Balthis | 252—313 |

RICHARD D. LOVERING, Primary Examiner

U.S. Cl. X.R.

106—38.35; 252—317